(12) United States Patent
Li et al.

(10) Patent No.: US 9,383,742 B2
(45) Date of Patent: Jul. 5, 2016

(54) SYSTEM AND METHOD FOR POSITIONING ERROR COMPENSATION DURING MANUFACTURING OF COMPLEX-SHAPED GAS TURBINE ENGINE PARTS

(71) Applicant: PRATT & WHITNEY CANADA CORP., Longueuil (CA)

(72) Inventors: Yuwen Li, Montreal (CA); Amr Elfizy, Longueuil (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 543 days.

(21) Appl. No.: 13/791,053

(22) Filed: Mar. 8, 2013

(65) Prior Publication Data

US 2014/0257542 A1   Sep. 11, 2014

(51) Int. Cl.
  *G05B 9/02*   (2006.01)
  *G05B 19/408*   (2006.01)
  *G05B 19/404*   (2006.01)

(52) U.S. Cl.
  CPC .......... *G05B 19/4086* (2013.01); *G05B 19/404* (2013.01); *G05B 2219/33257* (2013.01); *G05B 2219/33271* (2013.01); *G05B 2219/50296* (2013.01)

(58) Field of Classification Search
  None
  See application file for complete search history.

(56) References Cited

U.S. PATENT DOCUMENTS

| | | | |
|---|---|---|---|
| 5,917,726 A | 6/1999 | Pryor | |
| 6,094,793 A | 8/2000 | Szuba | |
| 6,662,071 B1 * | 12/2003 | Jackson | G05B 19/4097 700/159 |
| 6,912,446 B2 | 6/2005 | Wang et al. | |
| 6,969,821 B2 | 11/2005 | Mika et al. | |
| 2008/0250659 A1 | 10/2008 | Bellerose et al. | |
| 2010/0023157 A1 | 1/2010 | Burgess et al. | |
| 2010/0030365 A1 | 2/2010 | Lilly | |

FOREIGN PATENT DOCUMENTS

WO   WO94/11795   5/1994

* cited by examiner

*Primary Examiner* — Sean Shechtman
(74) *Attorney, Agent, or Firm* — Norton Rose Fulbright Canada LLP

(57) ABSTRACT

A system and method for error compensation in positioning a complex-shaped gas turbine engine part during manufacturing thereof with a machine. Theoretical measurements for a plurality of control points on the part are first retrieved. Actual measurements for the control points are then acquired in a coordinate system of the machine. If an error between the actual and theoretical measurements is beyond a tolerance, a transformation matrix is computed. The transformation matrix represents a transformation to be applied to the coordinate system to adjust a pose thereof for compensating the error. The transformation matrix may be computed and applied to the coordinate system iteratively until the actual measurements are brought within tolerance. A machining program may then be generated for manufacturing the part accordingly.

20 Claims, 12 Drawing Sheets

$x = 1\text{mm}, y = -1\text{mm}, z = -1\text{mm},$
$\theta = 3 \text{ deg}, \phi = 3 \text{ deg}, \psi = 0.5 \text{ deg},$

US 9,383,742 B2

SYSTEM AND METHOD FOR POSITIONING ERROR COMPENSATION DURING MANUFACTURING OF COMPLEX-SHAPED GAS TURBINE ENGINE PARTS

TECHNICAL FIELD

The application relates generally to a system and method for positioning error compensation during manufacturing of complex-shaped gas turbine engine parts.

BACKGROUND OF THE ART

Gas turbine engines typically comprise parts, such as turbine blades having complex curved surfaces. Such blades comprise an airfoil providing an aerodynamic shape and a root providing a fixing (or firtree) for assembly with turbine discs. When machining the firtree, the airfoil needs to be precisely positioned in the coordinate system of computer numerical control (CNC) machines.

In conventional designs, the blades are secured during firtree machining to holding fixtures or encapsulation blocks, which have contact features for clamping on the CNC machines. The contact features function as positioning datum relative to which the airfoil is to be precisely positioned. Any manufacturing inaccuracy in the encapsulation or the holding fixture can cause deviation in the measurement of distances between the contact features and a plurality of control points on the airfoil. As a result, rework of encapsulation blocks or fine adjustment of the holding fixtures may be required, which may increase the risk of blade scraps.

One known method for correcting inaccuracies is to determine the position and orientation of the airfoil by capturing the entire surface of the airfoil. This may be done by measuring numerous discrete points on the blade's curved surface using contact or non-contact measurement. The resulting point grids or point clouds are then compared to a three-dimensional computer-aided design (CAD) model of the part. Any discrepancies with the model may be corrected by applying a variety of treatment methods. However, these solutions prove cumbersome and ineffective for a variety of applications. In particular, contact probing measurement of a large amount of points is inefficient for high-volume production while non-contact measurement, which is less accurate than probing measurements, is affected by lighting conditions.

There is therefore a need for an improved system and method for positioning error compensation during manufacturing of complex-shaped gas turbine engine parts.

SUMMARY

In one aspect, there is provided a method for positioning error compensation during manufacturing of a complex-shaped gas turbine engine part with a machine, the method comprising retrieving theoretical measurements for a plurality of control points defined on the part; acquiring in an initial coordinate system of the machine actual measurements for the plurality of control points; computing an error between the actual measurements and the theoretical measurements, the error indicative of a mis-positioning of the part in the initial coordinate system; and if the error is beyond a predetermined tolerance, computing a transformation matrix representative of at least one transformation to be applied to the initial coordinate system for adjusting at least one of a position and an orientation thereof to compensate the error, and applying the transformation to the initial coordinate system; otherwise, generating a machining program for manufacturing the part accordingly.

In another aspect, there is provided a system for positioning error compensation during manufacturing of a complex-shaped gas turbine engine part with a machine, the system comprising a memory; a processor; and at least one application stored in the memory and executable by the processor for retrieving theoretical measurements for a plurality of control points defined on the part; acquiring in an initial coordinate system of the machine actual measurements for the plurality of control points; computing an error between the actual measurements and the theoretical measurements, the error indicative of a mis-positioning of the part in the initial coordinate system; and if the error is beyond a predetermined tolerance, computing a transformation matrix representative of at least one transformation to be applied to the initial coordinate system for adjusting at least one of a position and an orientation thereof to compensate the error, and applying the transformation to the initial coordinate system; otherwise, generating a machining program for manufacturing the part accordingly.

In a further aspect, there is provided a system for positioning error compensation during manufacturing of a complex-shaped gas turbine engine part with a machine, the system comprising means for retrieving theoretical measurements for a plurality of control points defined on the part; means for acquiring in an initial coordinate system of the machine actual measurements for the plurality of control points; means for computing an error between the actual measurements and the theoretical measurements, the error indicative of a mis-positioning of the part in the initial coordinate system; and if the error is beyond a predetermined tolerance, means for computing a transformation matrix representative of at least one transformation to be applied to the initial coordinate system for adjusting at least one of a position and an orientation thereof to compensate the error, and applying the transformation to the initial coordinate system; otherwise, means for generating a machining program for manufacturing the part accordingly.

DESCRIPTION OF THE DRAWINGS

Reference is now made to the accompanying figures in which.

DETAILED DESCRIPTION

Figure 1:
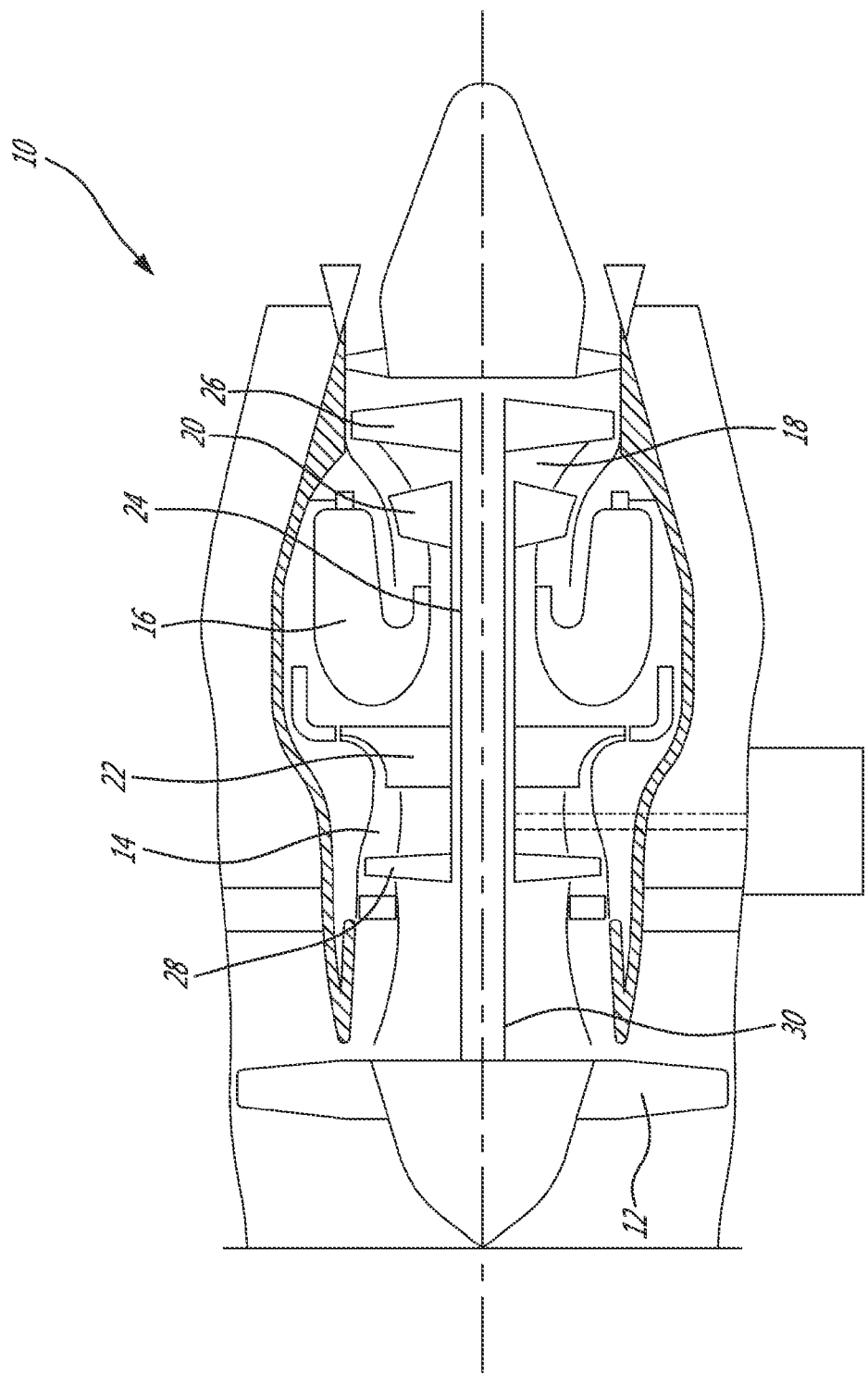
FIG. 1 is a schematic side cross-sectional view of a gas turbine engine.

FIG. 1 illustrates a gas turbine engine 10 of a type typically provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) 28 of the compressor section 14 through a low pressure shaft 30 extending within the high pressure shaft 24 and rotating independently therefrom.

The engine 10 illustratively comprises various parts, which have complex-curved surfaces. For instance, the engine 10 comprises turbine blades (not shown) having an airfoil providing an aerodynamic shape to the blade and a root providing the fixing, or firtree, for assembly with turbine discs. When manufacturing such engine parts, multi-axis Computer Numerical Control (CNC) machining centers may be used. The airfoil may first be precisely formed by casting or forging and the firtree may then be machined by grinding or broaching. Other processes may apply.

Figure 2:
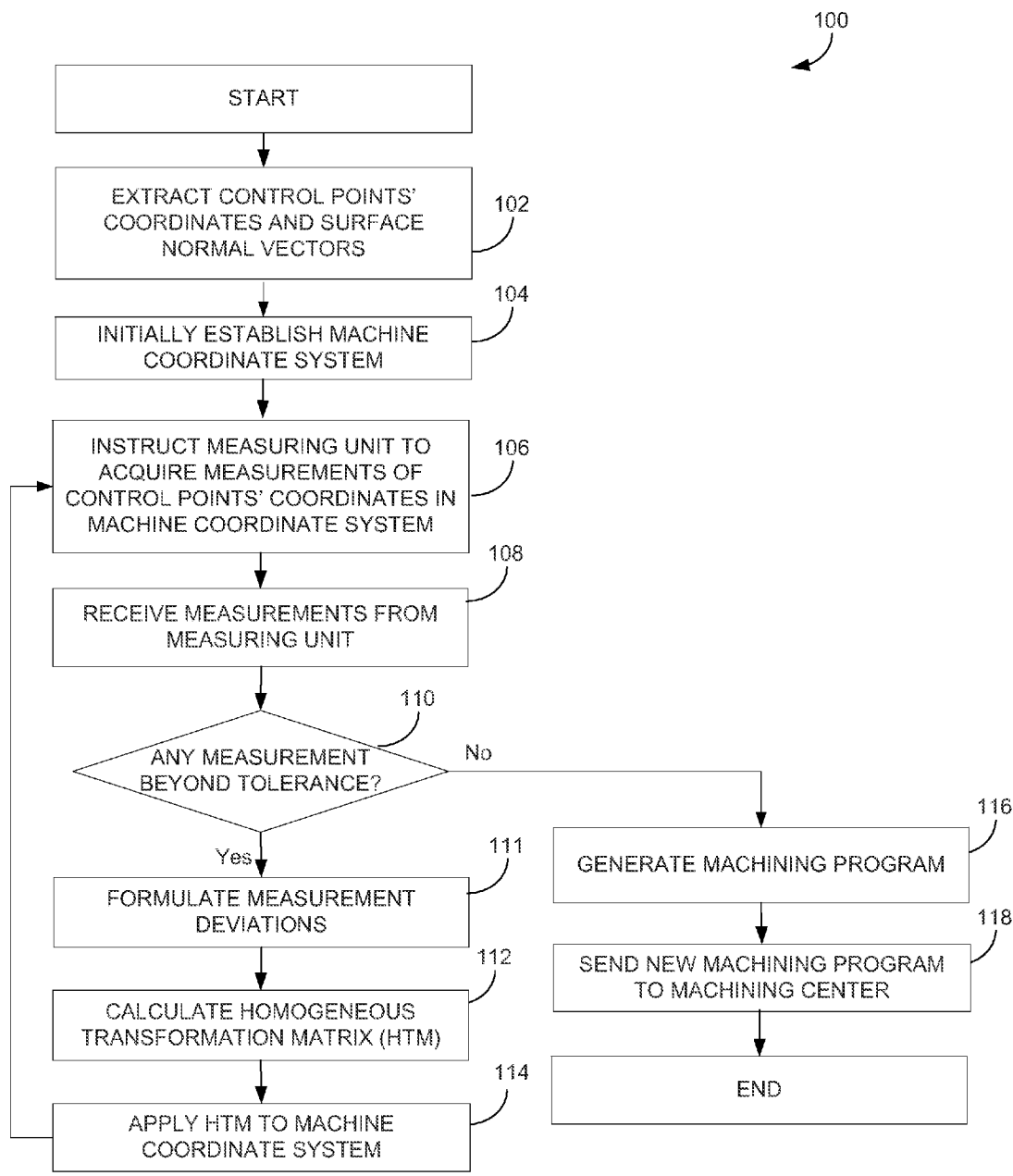
FIG. 2 is a flowchart of a method for positioning error compensation during manufacturing of a gas turbine engine part in accordance with an illustrative embodiment.

Referring to FIG. 2, a method 100 for positioning error compensation during manufacturing of a gas turbine engine part, such as a gas turbine engine blade, vane or vane segment, will now be described. The method 100 comprises extracting at step 102 theoretical coordinates and surface normal vectors of control points on the engine part. This design data may be retrieved from offline part design data comprising a theoretical model, which may be used as reference when machining the part. The design data determines the location of the part to be machined in the engine 10 and, in turn, the overall performance of the engine and may be stored in a database or any other suitable storage means. The control points illustratively serve as reference points from which the part's position and orientation in space can be determined. In some embodiments, the control points represent points of contact between the part being manufactured and a die (not shown) the part is placed in during encapsulation thereof.

Figure 3:
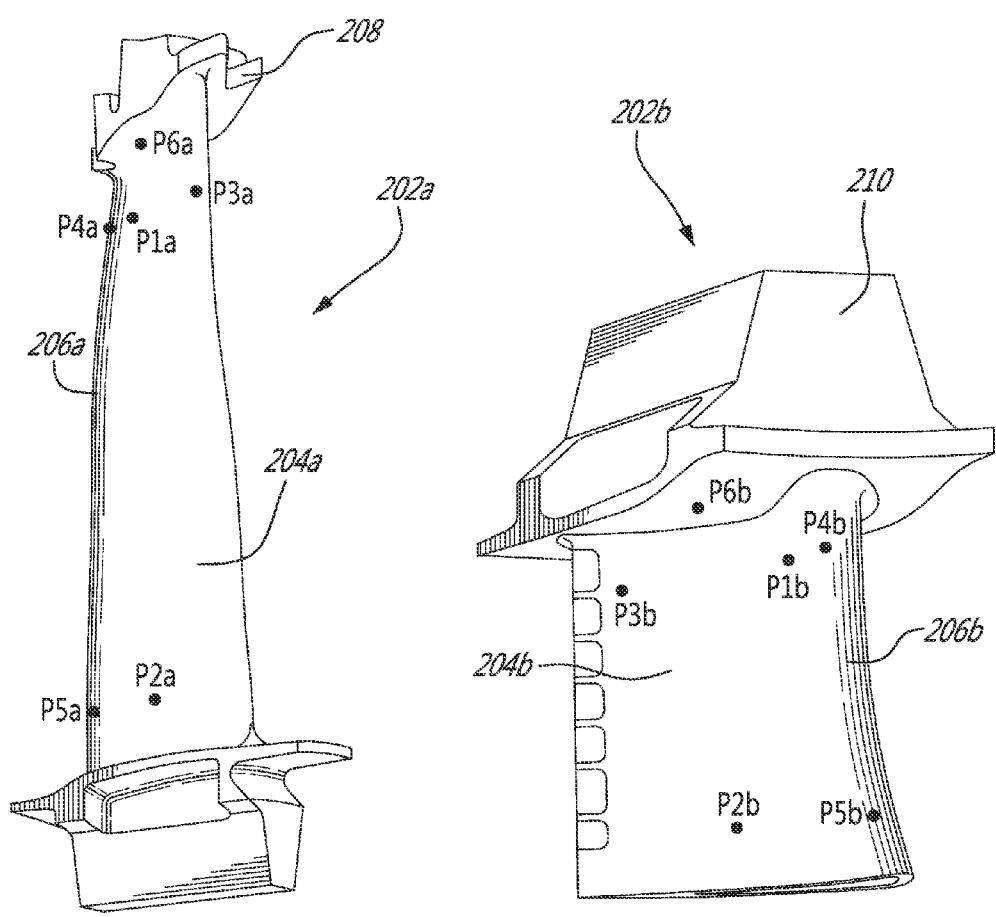
FIG. 3 is a schematic diagram of turbine blades in accordance with an illustrative embodiment.

As shown in FIG. 3, in one embodiment where a gas turbine engine blade, vane, or vane segment is manufactured, six (6) control points are defined to constrain the engine part in six (6) degrees of freedom. In particular, for the turbine blade 202a, three (3) points P1a, P2a, and P3a are positioned on the pressure side 204a of the blade 202a, two (2) points P4a and P5a are positioned on the leading edge 206a of the blade 202a, and one point P6a is positioned on the tip 208 of the blade 202a. Alternatively, for the turbine blade 202b, three (3) points P1b, P2b, and P3b are positioned on the pressure side 204b of the blade 202b, two (2) points P4b and P5b are positioned on the leading edge 206b of the blade 202b, and one point P6b is positioned on the root 210 of the blade 202b. It should however be understood that the control points may be located in other positions on the part surface. It should also be understood that any other number of control points may also be used depending on the application. For example, three (3) control points may be used for positioning the complex-shaped part in a plane, the three (3) control points being associated with two (2) translational displacements and one (1) rotational angle used as reference on the part.

Figure 4:
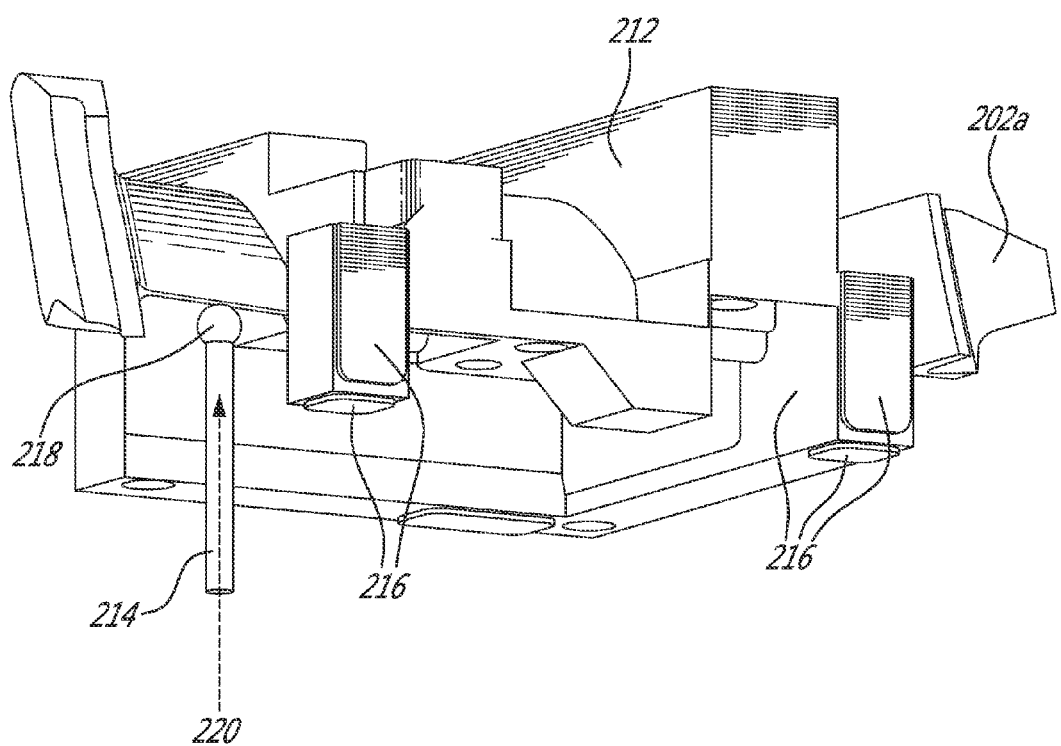
FIG. 4 is a schematic diagram of a probe being used to acquire measurements of a turbine blade of FIG. 3 held in an encapsulation block.

Referring to FIG. 4 in addition to FIG. 2, once the coordinates and surface normal vectors have been extracted from the design data, the engine part, e.g. the turbine blade 202a, may be secured in a holding fixture or encapsulation block 212. A predetermined tolerance or threshold may be allowed in positioning the part 202a and the part 202a may therefore be positioned relative to the encapsulation block 212 with a deviation from a theoretical or ideal position, provided the deviation does not exceed the predetermined tolerance. Still, it is desirable for the part 202a to be positioned so as to minimize deviations and prevent tolerance violations. The location of the part 202a with respect to its encapsulation 212 is therefore inspected to ensure proper positioning of the part 202a. For this purpose, once the part 202a is in position, the assembly comprising the engine part 202a and the encapsulation block 212 may in one embodiment be placed on a coordinate measuring machine (CMM) (not shown) connected to the CNC machining center (not shown). The CMM may then be used to acquire measurements on the part's surface and the encapsulated part 202a may be sent to machining only if the location of the part 202a is within the predetermined tolerance.

In an alternate embodiment where no existing CMM or CMM function is in use or provided, a measuring or part probing system 214 integrated with the CNC machining center may be used to effect the measurements. In this case, the part-encapsulation assembly may be placed in the CNC machining center directly. A plurality of contact surfaces as in 216 may be provided on the encapsulation block 212 for clamping on the CNC machining center. In order to acquire measurements, a tip 218 of the probe 214 may then be moved along a pre-programmed probing direction 220 toward positions on the part 202a where measurements are to be acquired. The probe 214 may further be coupled to a force sensor (not shown), which acquires a measurement signal when the probe tip 218 touches the surface of the part 202a. When it is determined from the measurements that the part's location is within the tolerance, the part 202a may be machined on the CNC machine directly.

Whether a CMM or probing system as in 214 is used, the coordinate system of the CNC machine is established so that measurements are first acquired in this initial coordinate system. The step 104 of the method 100 thus comprises initially establishing the machine coordinate system. For this purpose, the contact surfaces 216 of the encapsulation block 212 may be used as reference, such surfaces 216 being in contact with the CMM or the CNC machine when the part is positioned for measurement. The machine coordinate system may be established using the Cartesian coordinate system and illustratively comprises X, Y, and Z axes. Once the machine coordinate system is established, the next step 106 may then be to instruct the measuring unit, i.e. the CMM or the machine integrated probing system as in 214, to acquire the desired measurements. In particular, the measuring unit is instructed to acquire measurements for each one of the part's control points and this in the machine coordinate system established at step 104. The measurements, once obtained by the measuring unit, are received at step 108.

The method 100 may then assess at step 110 whether any of the measurements is beyond the predetermined tolerance. For this purpose, a difference may be computed between the received measurements and the theoretical data extracted at step 102 and the difference compared to the tolerance. A difference or deviation from the theoretical data may be the result of mis-positioning of the engine part. In order to compensate for such deviation, the method 100 may adjust the pose, i.e. the position and/or orientation, of the machine coordinate system. In particular, if any of the measurements is above the tolerance, the measurement deviations are formulated at step 111 and a homogeneous transformation matrix (HTM) is computed at step 112. The matrix is indicative of a transformation, e.g. translation and/or rotation, to be applied to the machine coordinate system in order to compensate for the measurement deviations. The calculated transformation matrix may then be applied at step 114 to the initial machine coordinate system, resulting in a new or transformed coordinate system, which is a translated and/or rotated version of the original coordinate system. The method 100 may then flow back to the step 106 of instructing the measuring unit, i.e. the CMM or the probing system (reference 214 in FIG. 4), to acquire new measurements in the transformed coordinate system. Steps 106 to 114 may be repeated until none of the measurements are found at step 110 to be beyond tolerance. The above-described iterative process enables fine tuning of the pose of the machine coordinate system until the measurements are within tolerance, i.e. the part is in an acceptable position.

Figure 5:
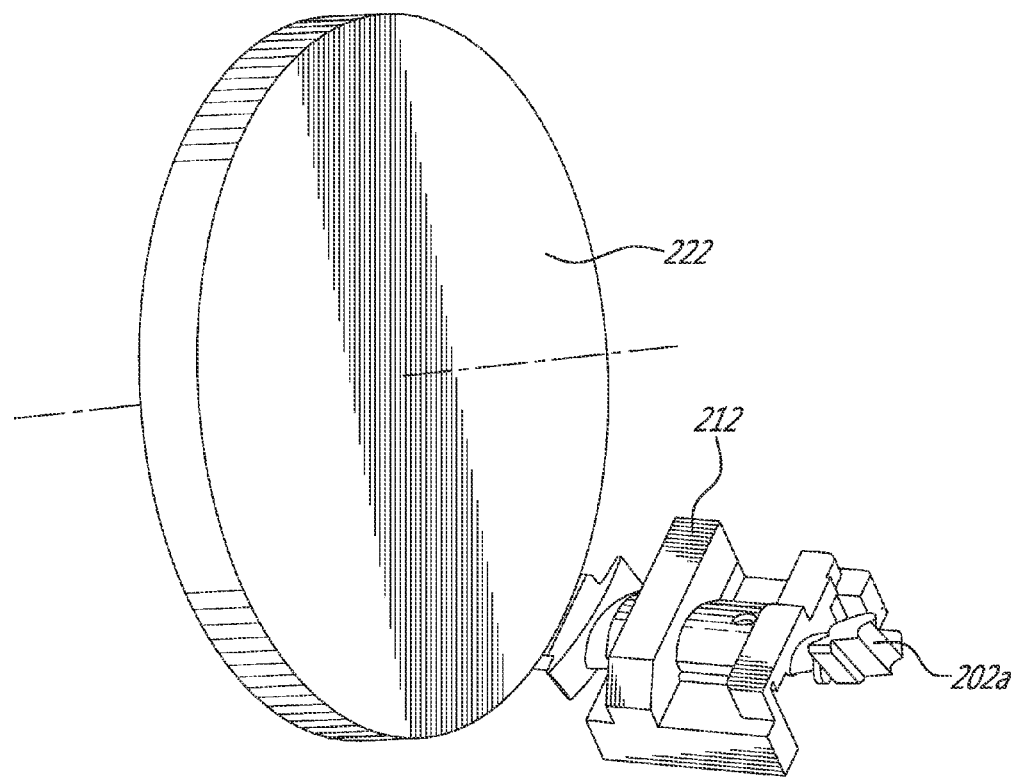
FIG. 5 is a schematic diagram of the turbine blade of FIG. 4 during machining thereof.

If it is determined at step 110 that no measurement is beyond the tolerance, the next step 116 may then be to generate a machining program for the part. The machining program may comprise commands that indicate a numerically-controlled tool path to be followed by at least one tool of the machining center for manufacturing the whole or a portion of the part. When an HTM has been previously computed at step 112 in order to bring the measurements within tolerance, the generated machining program may comprise the calculated HTM. This can be done by post-processing the original CNC program to update the machine coordinate system as per the HTM or by applying dynamic fixture offset compensation to the CNC machining center. In this manner, it becomes possible to ensure during manufacturing of the part that the machine coordinate system is aligned with the HTM. The new machining program may then be sent at step 118 to the CNC machining center for machining the part accordingly. Once the machining program is received at the CNC machining center, the CNC machining center may either machine the part or, in cases where a CMM has been used, the engine part may be removed from the CMM prior to machining of the part. It should be understood that any suitable manufacturing process, such as drilling, trepanning, cutting, boring, electrical discharge machining (EDM), wire electrical discharge machining (WEDM), broaching, grinding, milling, welding, or the like, may be used. For example and as shown in FIG. 5, a grinding wheel 222 may be used to machine a root (not shown) of the blade 202a. It should also be understood that the part, e.g. the blade 202a, may be secured to the CNC machine in other places. For example, the part may be clamped at the root on the CNC machine for drilling cooling holes on the part's airfoil surface.

Figure 6:
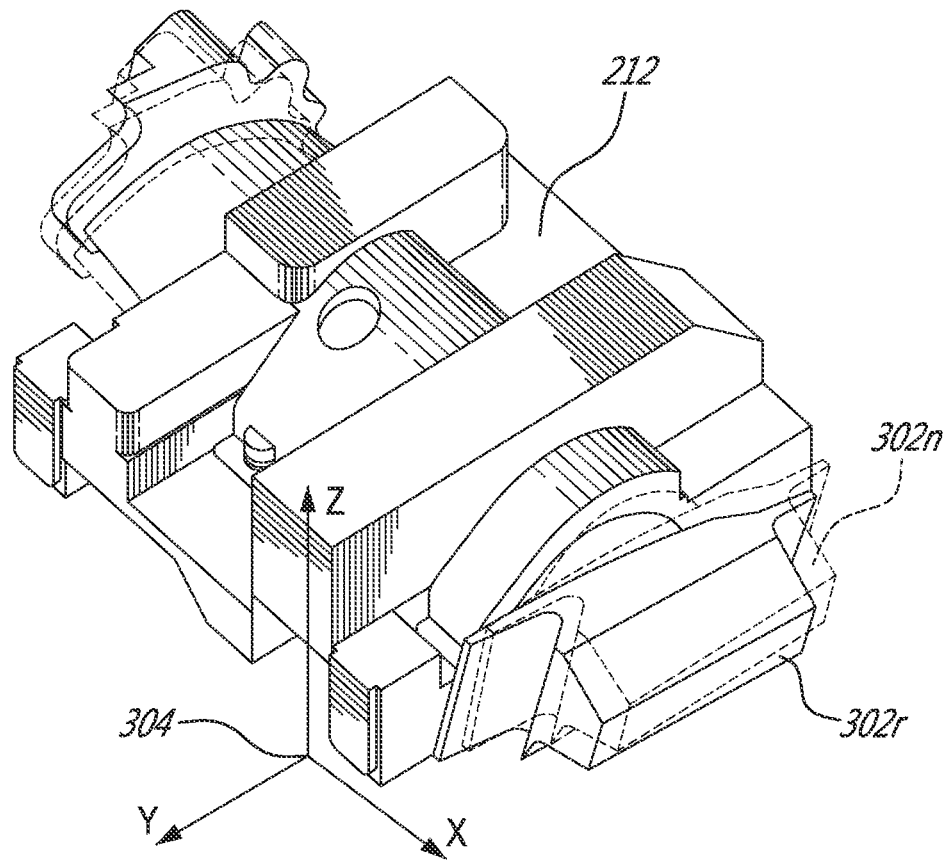
FIG. 6 is a schematic diagram of a mis-positioned blade in accordance with an illustrative embodiment.

As shown in FIG. 6, due to mis-positioning of the engine part within the encapsulation 212, there is an offset between the part's nominal position 302n and the part's real or actual position 302r, as measured in the machine coordinate system 304 initially established at step 104 of FIG. 2. As used herein, the term "nominal" as applied to a part, surface, geometrical element, etc., is intended to refer to the part, surface, geometrical element (e.g. a surface, profile, angle, plate, or other feature defining the part), etc. as defined in a theoretical model such as a Computer Aided Design (CAD) model, without tolerance, which may be used as a reference when machining one or a plurality of similar actual parts, surfaces, geometrical elements, etc. The term "real" or "actual" as applied to a part, surface, geometrical element, etc., is intended to refer to the real, physical part, surface, geometrical element, etc. at various stages of the manufacturing process, including any variation brought by that process.

Figure 7:
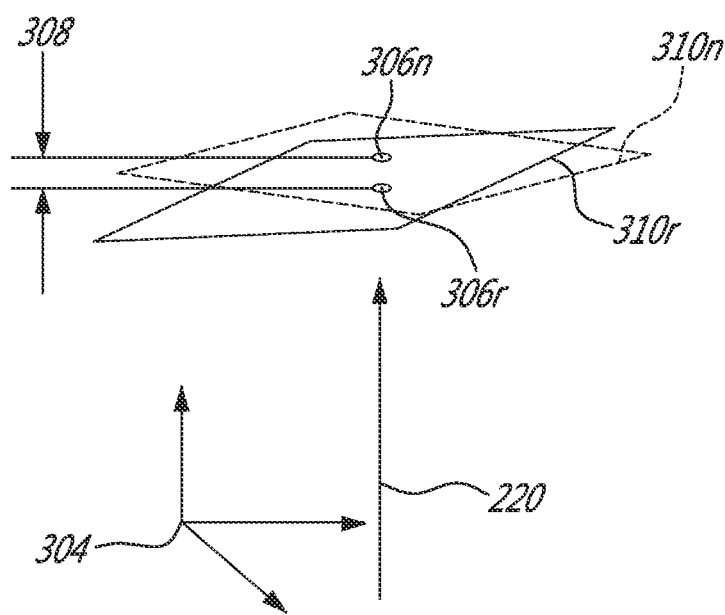
FIG. 7 is a schematic diagram of a measurement deviation between a nominal control point and a real probe contact point in accordance with an illustrative embodiment.

As seen in FIG. 7, due to mis-position of the part 302r, when contact measurement is used, the contact element (e.g. contact probe 214) of the measuring unit contacts a real contact point 306r on the mis-positioned part 302r rather than a nominal point 306n. The real contact point 306r is offset from the nominal control point 306n by a deviation ($d_i$) 308 and can be assumed to lie on a plane 310r that is tangential to the part's surface. The tangential plane 310r is further offset from a nominal tangential plane 310n through the nominal control point 306n. In one embodiment, the measurement deviation 308 can be determined from the measurements received from the measuring unit. However, the exact pose of the mis-positioned part in the machine coordinate system 304 is to be determined in order to generate the HTM.

In one embodiment, three (3) translational offsets [x, y, z] and three (3) Euler angles [$\theta$, $\phi$, $\psi$] are used to represent the pose of the mis-positioned part in six (6) degrees-of-freedom. In particular, the translational offsets [x, y, z] respectively correspond to a linear offset along the X-axis of the machine coordinate system, a linear offset along the Y-axis, and a linear offset along the Z-axis. The Euler angles [$\theta$, $\phi$, $\psi$] respectively correspond to an angular offset (pitch) in a rotary direction about the X-axis, an angular offset (yaw) in a rotary direction about the Y-axis, and an angular offset (roll) in a rotary direction about the Z-axis.

The formulation for the deviations $d_i$ can be derived as a function of the translational offsets and Euler angles, which represent the pose of the mis-positioned part, as follows:

$$d_i = f_i(x, y, z, \theta, \phi, \psi) \quad (1)$$

where i represents the $i^{th}$ contact point measurement and $f_i$ represents functions linking, for each contact point, the translational offsets [x, y, z] and Euler angles [$\theta$, $\phi$, $\psi$] to the measurement deviations $d_i$.

Figure 8:
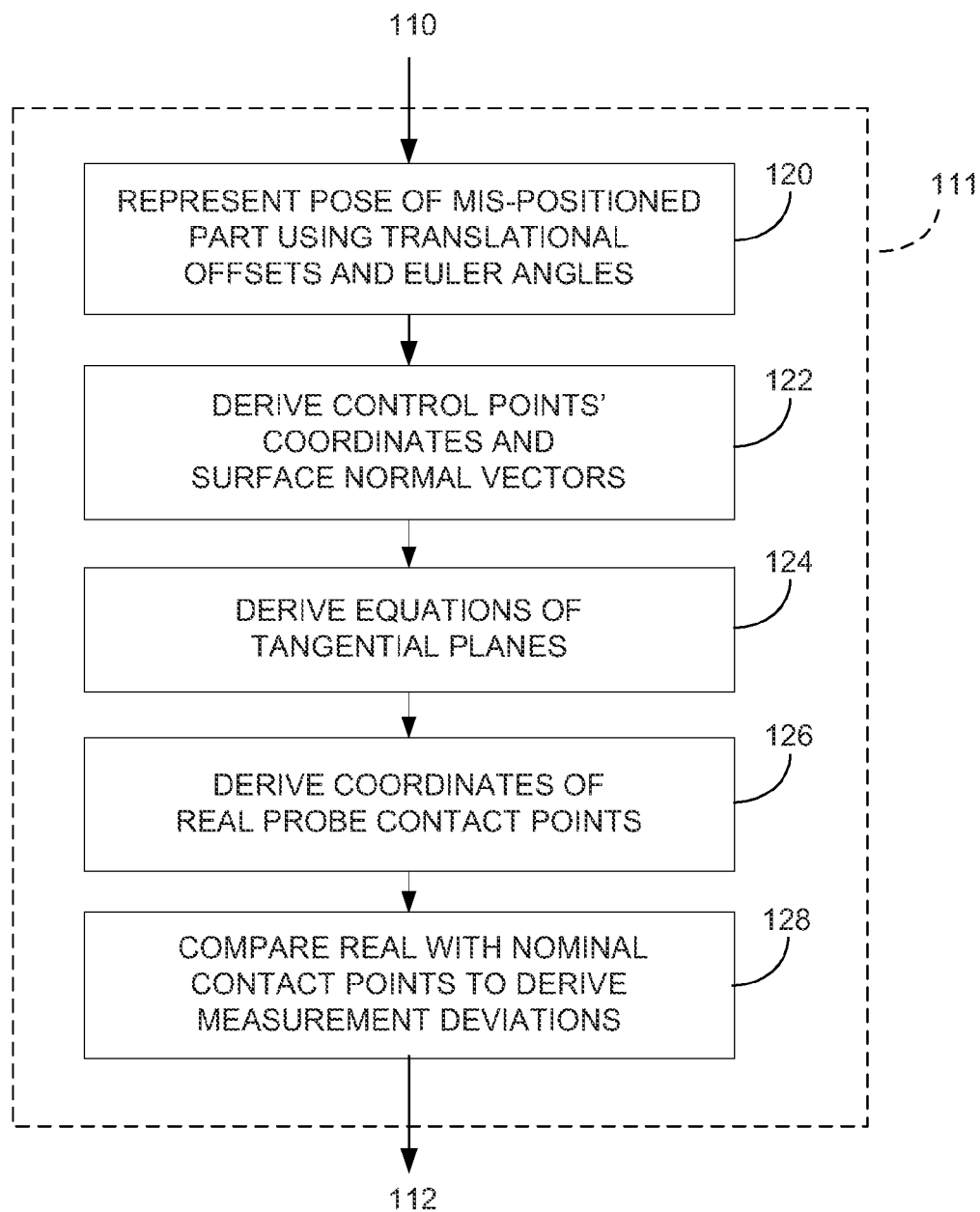
FIG. 8 is a flowchart of the step of FIG. 2 of formulating measurement deviations.

Referring now to FIG. 8, the step 111 of formulating the measurement deviations $d_i$, as defined in equation (1), illustratively comprises representing at step 120 the pose of the mis-positioned part using the translational offsets [x, y, z] and Euler angles [$\theta$, $\phi$, $\psi$]. The next step 122 may then be to derive the coordinates of the control points as well as their surface normal vectors for the mis-positioned part. Once these have been obtained, equations for tangential planes through the control points on the mis-positioned part may be derived at step 124. The coordinates of the real probe contact points on the mis-positioned part may then be formulated at step 126. In particular, the real probe contact points correspond to the intersections between the tangential planes derived at step 124 and the probing directions (reference 220 in FIG. 7). The real probe contact points may then be compared at step 128 to the nominal control points in order to derive a formulation for the measurement deviations $d_i$ obtained from the measuring unit, i.e. the CMM or the probing system (reference 214 in FIG. 4).

In one embodiment, the equation (1) is formulated at step 111 so as to be solved for the translational offsets [x, y, z] and Euler angles [$\theta$, $\phi$, $\psi$], from accordingly at least six (6) deviation measurements $d_i$ obtained from the measuring unit. The equation (1) may be solved numerically using the Newton-Raphson method. If measurements are obtained for more than six (6) control points, least square fitting techniques may be used to obtain the optimal values of the translational offsets [x, y, z] and Euler angles [θ, φ, ψ].

Upon solving equation (1) using the deviation measurements $d_i$ obtained from the measuring unit, the value of the translational offsets [x, y, z] and Euler angles [θ, φ, ψ], which represent the pose of the part, may be obtained. In the example of FIG. 6, the translational offsets and Euler angles for the blade 302r are respectively found to be: [x, y, z]=[1, −1, −1] (mm) and [θ, φ, ψ]=[3, 3, 0.5] (degrees). It should be understood that any other number of measurements may also be obtained depending on the application. For example, three (3) measurements on three (3) control points may be used for positioning the part in the XY plane (not shown), the three (3) measurements being used to solve for the translational offsets [x, y] and the Euler angle ψ.

Once equation (1) is solved and the translational offsets [x, y, z] and Euler angles [θ, φ, ψ] are found, the HTM can be generated using these values as matrix coefficients. In this manner, by applying the transformation of the HTM to the initial machine coordinate system, the position and/or orientation of the latter can be adjusted by the amount of the translational offsets and Euler angles. Thus, in the transformed coordinate system, the deviations in the part's measurements are compensated for. As a result, future measurements acquired for the part in the transformed coordinate system may then be brought closer to tolerance than the initial measurements acquired in the initial coordinate system. In the example of FIG. 6, applying the HTM to the coordinate system 304 may result in the coordinate system 304 being translated by 1 mm in the positive X direction, 1 mm in the negative Y direction, and by 1 mm in the negative Z direction. Applying the HTM to the coordinate system 304 may further result in rotation of the coordinate system 304 by 3 degrees in the rotary direction about the X-axis, 3 degrees in the rotary direction about the Y-axis, and 0.5 degrees in the rotary direction about the Z-axis.

Figure 9:
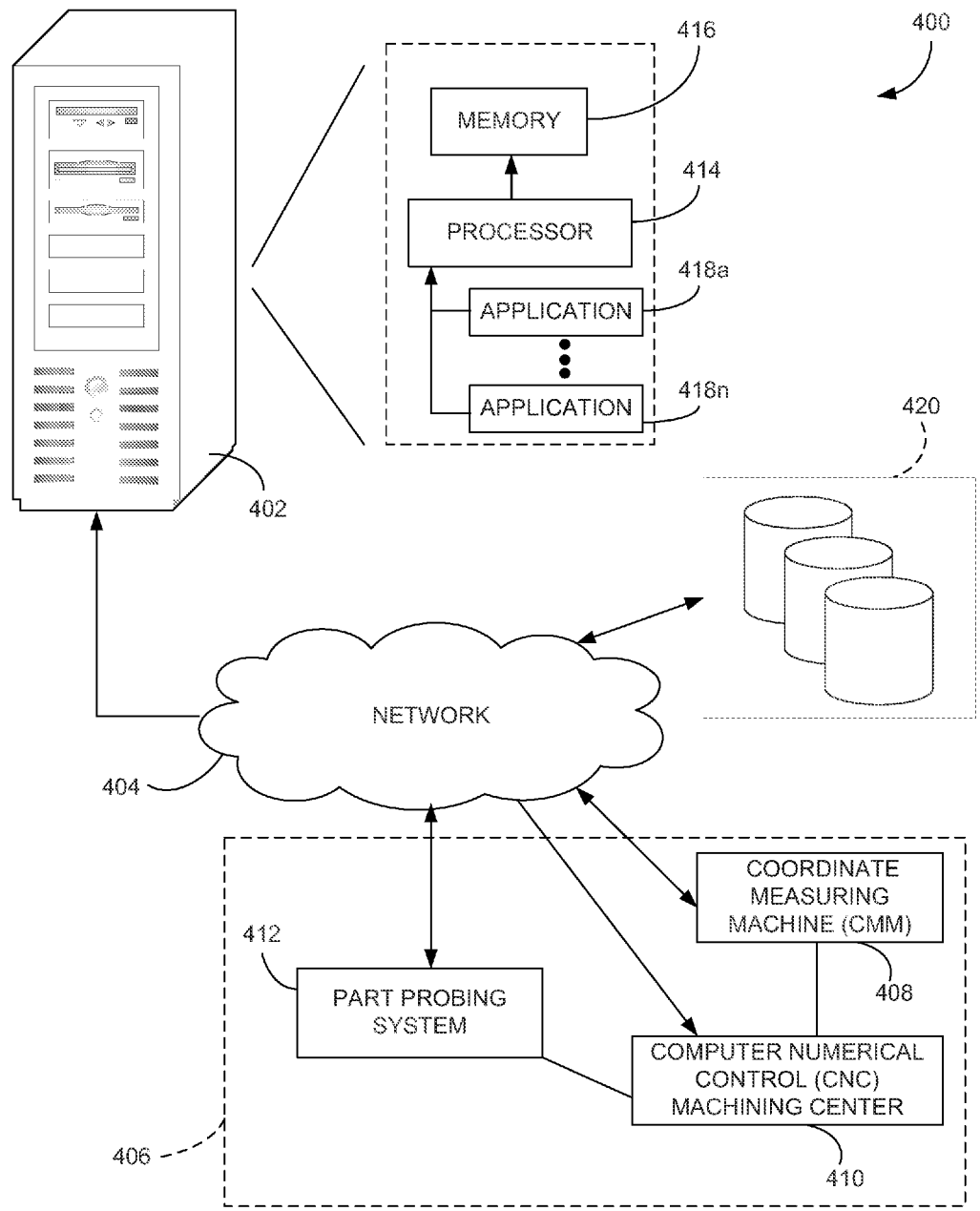
FIG. 9 is a schematic diagram of a system for positioning error compensation during manufacturing of a gas turbine engine part in accordance with an illustrative embodiment.

Referring now to FIG. 9, a system 400 for positioning error compensation during manufacturing of a gas turbine engine part, will now be described. The system 400 comprises one or more server(s) 402. For example, a series of servers corresponding to a web server, an application server, and a database server may be used. These servers are all represented by server 402 in FIG. 9. The server 402 is in communication over a network 404, such as the Internet, a cellular network, or others known to those skilled in the art, with a measuring unit 406 for acquiring measurements of the engine part. The measuring unit 406 may comprise a CMM 408 connected to a CNC machining center 410 or a part probing system 412 integrated with the CNC machining center 410. It should be understood that the measuring unit 406 may comprise any other suitable part sensing system using one of a variety of contact and non-contact technologies.

The server 402 may comprise, amongst other things, a processor 414 coupled to a memory 416 and having a plurality of applications 418a, . . . , 418n running thereon. The processor 402 may access the memory 416 to retrieve data. The processor 402 may be any device that can perform operations on data. Examples are a central processing unit (CPU), a microprocessor, and a front-end processor. The applications 418a, . . . , 418n are coupled to the processor 414 and configured to perform various tasks as explained below in more detail. It should be understood that while the applications 418a, . . . , 418n presented herein are illustrated and described as separate entities, they may be combined or separated in a variety of ways.

The memory 416 accessible by the processor 414 may receive and store data. The memory 416 may be a main memory, such as a high speed Random Access Memory (RAM), or an auxiliary storage unit, such as a hard disk or flash memory. The memory 416 may be any other type of memory, such as a Read-Only Memory (ROM), Erasable Programmable Read-Only Memory (EPROM), or optical storage media such as a videodisc and a compact disc.

One or more databases 420 may be integrated directly into the memory 416 or may be provided separately therefrom and remotely from the server 402 (as illustrated). In the case of a remote access to the databases 420, access may occur via any type of network 404, as indicated above. The databases 420 described herein may be provided as collections of data or information organized for rapid search and retrieval by a computer. The databases 420 may be structured to facilitate storage, retrieval, modification, and deletion of data in conjunction with various data-processing operations. The databases 420 may consist of a file or sets of files that can be broken down into records, each of which consists of one or more fields. Database information may be retrieved through queries using keywords and sorting commands, in order to rapidly search, rearrange, group, and select the field. The databases 420 may be any organization of data on a data storage medium, such as one or more servers.

In one embodiment, the databases 420 are secure web servers and Hypertext Transport Protocol Secure (HTTPS) capable of supporting Transport Layer Security (TLS), which is a protocol used for access to the data. Communications to and from the secure web servers may be secured using Secure Sockets Layer (SSL). Identity verification of a user may be performed using usernames and passwords for all users. Various levels of access rights may be provided to multiple levels of users.

Alternatively, any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol).

Figure 10:
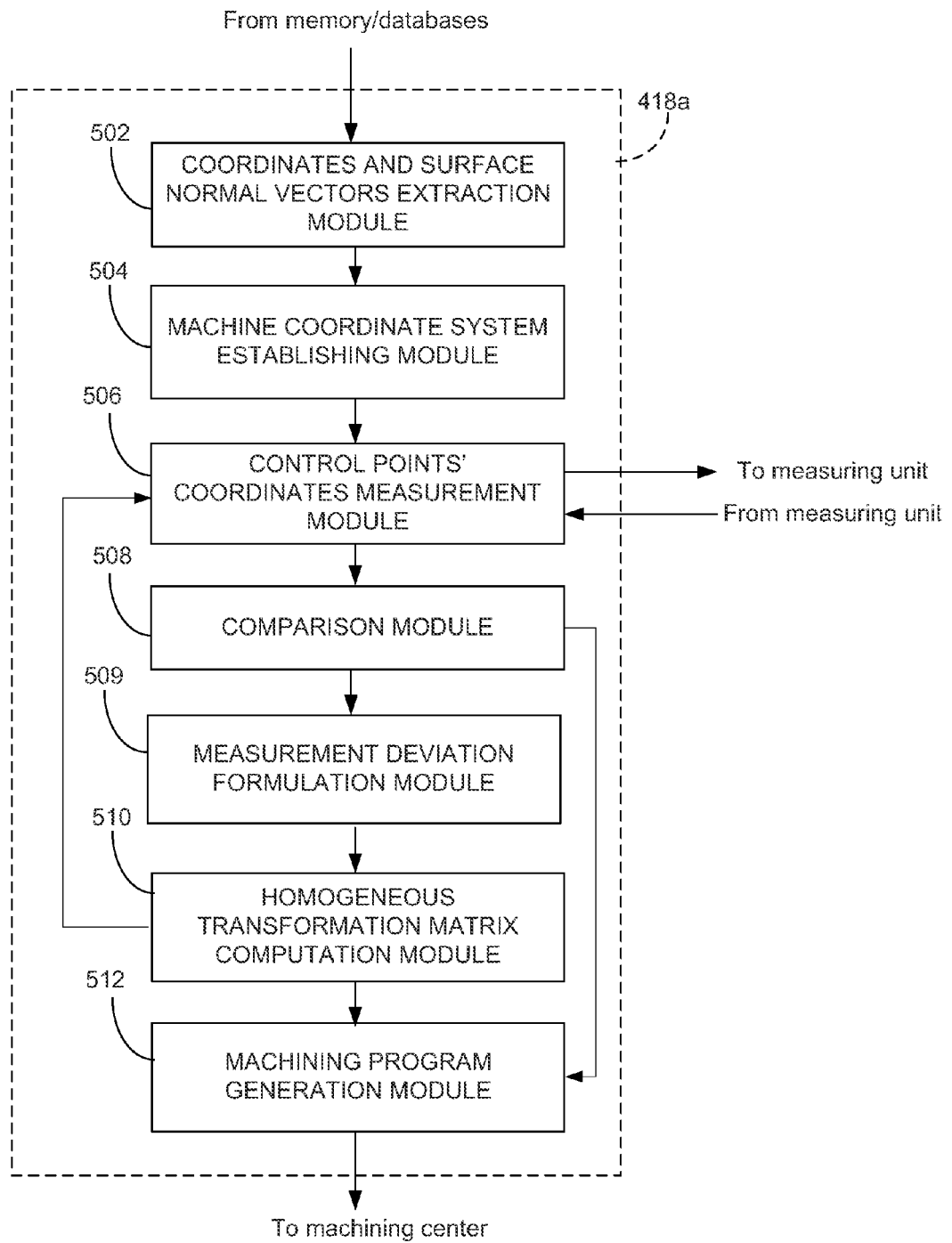
FIG. 10 is a schematic diagram of an application running on the processor of FIG. 9.

FIG. 10 is an exemplary embodiment of an application 418a running on the processor 414. The application 418a illustratively comprises a coordinates and surface normal vectors extraction module 502, a machine coordinate system establishing module 504, a control points' coordinates measurement module 506, a comparison module 508, a measurement deviation formulation module 509, a homogeneous transformation matrix computation module 510, and a machining program generation module 512.

The coordinates and surface normal vectors extraction module 502 first retrieves the theoretical coordinates and surface normal vectors from part design data, which may be stored in the memory 416 and/or databases 420. The extracted data is then passed on to the machine coordinate system establishing module 504, which establishes the initial machine coordinate system, as discussed above. The control points' coordinates measurement module 506 may then send a signal to the measuring unit 406, i.e. to the CMM 408 or to the part probing system 412, to cause the measuring unit 406 to acquired measurements for control points on the part's surface. The measurements are then received by the control points' coordinates measurement module 506 and sent to the comparison module 508. The comparison module 508 may then compute the difference between the received data and the theoretical data extracted by the extraction module 502. The comparison module 508 may further compare the difference to a predetermined tolerance, which may be retrieved from the memory 416 and/or databases 420. If the difference is below the tolerance, the comparison module 508 may communicate with the machining program generation module 512 so the latter generates a machining program to be sent to the machining center 410 for machining the part.

Otherwise, if the difference between the measured and the theoretical data is above the tolerance, the comparison module 508 may communicate with the measurement deviation formulation module 509. The measurement deviation module 509 may then formulate the deviations $d_i$ as per equation (1) above and communicate the formulation to the homogeneous transformation matrix computation module 510. From the measurement deviations $d_i$ formulated by the measurement deviation formulation module 509, the homogeneous transformation matrix computation module 510 generates the HTM that will be used to adjust the pose of the machine coordinate system for error compensation. As discussed above with reference to FIG. 2, the pose of the machine coordinate system is fine tuned iteratively in order to bring measurements within tolerance. As such, after having computed the HTM, the homogeneous transformation matrix computation module 510 communicates with the control points' coordinates measurement module 506 to cause acquisition of new measurements on the part's surface. A new comparison may then be performed by the comparison module 508 to assess whether the new measurements are within tolerance, thus indicating whether the previous HTM computation has been performed and applied accurately. As long as at least one measurement is beyond the tolerance, the homogeneous transformation matrix computation module 510, the control points' coordinates measurement module 506, and the comparison module 508 may be used iteratively. Once the comparison module 508 determines that all measurements are found to be within tolerance, the HTM is sent to the machining program generation module 512 for generation of a CNC machining program. The generated machining program is then sent to the machining center 410 so the part can be machined accordingly.

Figure 11:
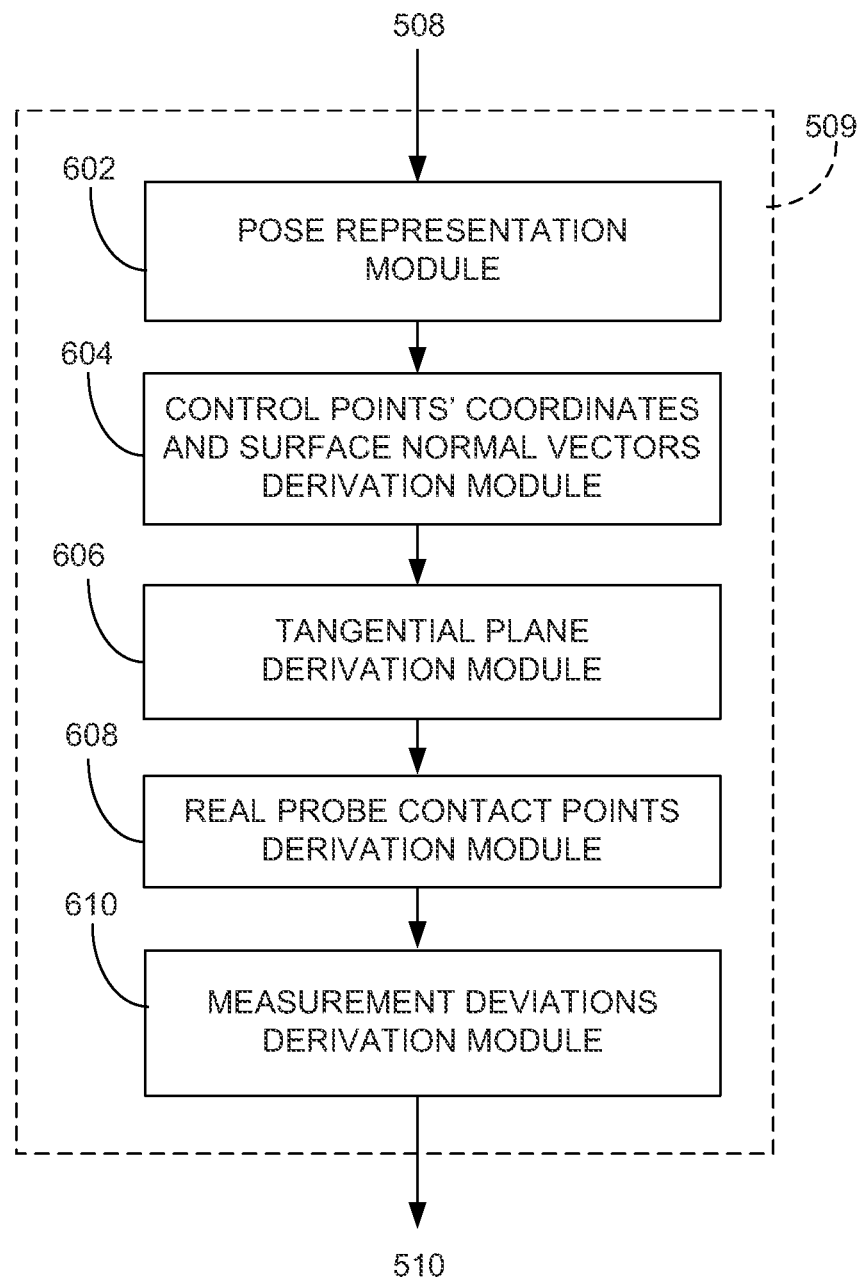
FIG. 11 is a schematic diagram of the measurement deviation formulation module of FIG. 10.

Referring now to FIG. 11, the measurement deviation formulation module 509 illustratively comprises a pose representation module 602 for representing the part's pose using the translational offsets and Euler angles discussed herein above. A control points' coordinates and surface normal vectors derivation module 604 is then used to derive the coordinates of the control points as well as the surface normal vectors. Tangential planes through the control points are then obtained by a tangential plane derivation module 606. Using a real probe contact points derivation module 608, the location of the real probe contact points can then be obtained by determining the intersections between the tangential planes and the probing direction of the probing element, e.g. probe, of the measuring unit 406. A measurement deviations derivation module 610 may then be used to provide the formulation of the measurement deviations by comparing the nominal point location with the real probe contact point location from real probe contact points derivation module 608.

Figure 12:
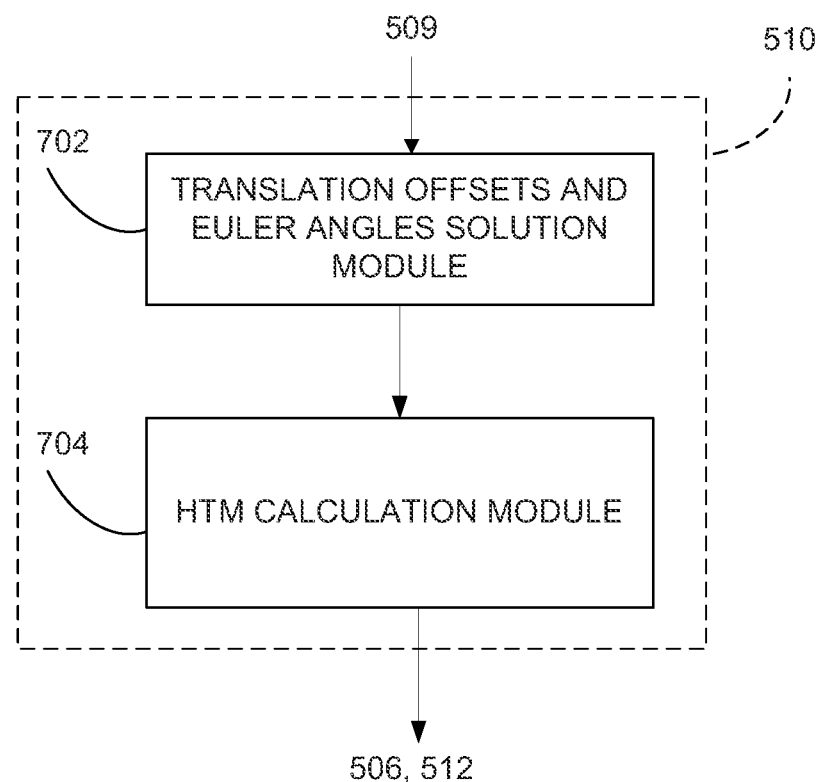
FIG. 12 is a schematic diagram of the homogeneous transformation matrix computation module of FIG. 10.

Referring to FIG. 12, the homogeneous transformation matrix computation module 510 may be used to obtain the HTM from the measurement deviations formulated by the measurement deviation formulation module 509. For this purpose, the homogeneous transformation matrix computation module 510 illustratively comprises a translational offsets and Euler angles solution module 702 and an HTM calculation module 704. The translational offsets and Euler angles solution module 702 solves equation (1) to obtain the pose the mis-positioned part while the HTM calculation module provides the HTM from the translational offsets [x, y, z] and Euler angles [θ, φ, ψ] solved by the solution module 702.

Even if a part is mis-positioned, e.g. misplaced in its encapsulation, the method 100 and system 400 described above enable for precision positioning and machining of the part by adjusting the pose of the CNC machine coordinate system to compensate for positioning errors. In this manner, less accurate and expensive devices, such as encapsulation blocks or holding fixtures, may be used to clamp the part on the machining center. Thus, the amount of scrap parts, rework, and associated human intervention resulting from use of inaccurate devices is reduced. Quality notifications in the encapsulation process may also be minimized while increasing the tolerances used in machining the part. In addition, a limited number, e.g. six (6) in one embodiment, of measurements needs to be acquired on the part's surface to achieve error compensation. The method 100 and system 400 are therefore well suited for part measurements where full surface capture is not possible, for instance due to the lack of line-of-sight or limited scanning aperture of the measuring system. Also, the method 100 and system 400 may be applied to high-volume production, where CMM contact probing measurement or CNC machine integrated probing measurement may be used. As such, robust automation using palletization and zero-point clamping can be achieved.

It should be understood that, although the method 100 and system 400 have been described above with reference to a turbine blade, other engine parts, such as fan blades, cases, vanes, vane segments, or any other engine components that require control points, may apply. Such engine parts may or may not be held in encapsulation blocks or holding fixtures. Also, it should be understood that the method 100 and system 400 may apply to other types of engines than the one illustrated in FIG. 1. As discussed above, it should further be understood that the method 100 and system 400 may apply to any suitable manufacturing process, such as drilling, trepanning, cutting, boring, electrical discharge machining (EDM), wire electrical discharge machining (WEDM), broaching, grinding, milling, welding, or the like. It should also be understood that, although the above explanation of the method 100 and system 400 discuss measurements at six (6) control points being taken for six-degrees-of-freedom compensation, any other number of measurements and control points may apply. Moreover, the control points may be located in positions different from those shown in FIG. 3.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method for positioning error compensation during manufacturing of a complex-shaped gas turbine engine part with a machine, the method comprising:
    retrieving theoretical measurements of a plurality of control points defined on the part;
    acquiring, in an initial coordinate system of the machine, actual measurements of the plurality of control points defined on the part;
    computing an error between the actual measurements of the part and the theoretical measurements of the part, the error indicative of a mis-positioning of the part in the initial coordinate system;

when the error is beyond a predetermined tolerance, computing a transformation matrix representative of at least one transformation to be applied to the initial coordinate system for adjusting at least one of a position and an orientation of the initial coordinate system to compensate the error, and applying the transformation matrix to the initial coordinate system to obtain a transformed coordinate system; and generating a machining program for manufacturing the part based on the transformed coordinate system.

2. The method of claim 1, further comprising setting the transformed coordinate system as the initial coordinate system, and repeating, until the error is below the tolerance, the acquiring the actual measurements, computing the error, computing the transformation matrix, and applying the transformation matrix.

3. The method of claim 2, wherein generating the machining program comprises one of applying dynamic fixture offset compensation to the machine and post-processing an original machining program for updating the initial coordinate system as per the transformation matrix.

4. The method of claim 1, wherein retrieving the theoretical measurements comprises retrieving the theoretical measurements of the gas turbine engine part selected from the group consisting of a gas turbine engine blade, a fan blade, a case, a vane, and a vane segment.

5. The method of claim 4, wherein the method is for positioning error compensation during manufacturing of the part with a numerical control machining center and further wherein acquiring the actual measurements comprises causing one of a coordinate measuring machine connected to the machining center and a part probing system integrated with the machining center to acquire the actual measurements.

6. The method of claim 5, wherein retrieving the theoretical measurements comprises retrieving coordinates of each one of the plurality of control points and further wherein acquiring the actual measurements comprises
    instructing the probing system to move towards the coordinates of each one of the control points and contact a surface of the part at a probe contact point, and
    recording a deviation between the coordinates of the control point and a location of the probe contact point.

7. The method of claim 6, wherein computing the transformation matrix comprises formulating an equation of the deviation as a function of three translational offsets and three Euler angles and solving the equation for the translational offsets and Euler angles to obtain coefficients of the transformation matrix.

8. The method of claim 7, wherein formulating the equation comprises:
    representing at least one of a position and an orientation of the part using the translational offsets and the Euler angles; and
    for each one of the plurality of control points,
        computing at least one surface normal vector at the control point,
        computing from the at least one surface normal vector a tangential plane through the control point,
        obtaining the location of the probe contact point, and,
        comparing the coordinates of the control point to the location of the probe contact point to formulate the deviation as a function of the translational offsets and Euler angles.

9. The method of claim 8, wherein computing the location of the probe contact point comprises computing an intersection between the tangential plane and a probing direction of the probing system.

10. The method of claim 1, wherein generating a machining program comprises generating a machining program for manufacturing the part using at least one of drilling, trepanning, cutting, boring, electrical discharge machining, wire electrical discharge machining, broaching, grinding, milling, and welding.

11. A system for positioning error compensation during manufacturing of a complex-shaped gas turbine engine part with a machine, the system comprising:
    a memory;
    a processor; and
    at least one application stored in the memory and executable by the processor for:
    retrieving theoretical measurements of a plurality of control points defined on the part;
    acquiring, in an initial coordinate system of the machine, actual measurements of the plurality of control points defined on the part;
    computing an error between the actual measurements of the part and the theoretical measurements of the part, the error indicative of a mis-positioning of the part in the initial coordinate system;
    when the error is beyond a predetermined tolerance, computing a transformation matrix representative of at least one transformation to be applied to the initial coordinate system for adjusting at least one of a position and an orientation of the initial coordinate system to compensate the error, and applying the transformation matrix to the initial coordinate system to obtain a transformed coordinate system; and
    generating a machining program for manufacturing the part based on the transformed coordinate system.

12. The system of claim 11, wherein the at least one application is executable by the processor for setting the transformed coordinate system as the initial coordinate system, and repeating, until the error is below the tolerance, the acquiring the actual measurements, computing the error, computing the transformation matrix, and applying the transformation matrix.

13. The system of claim 12, wherein the at least one application is executable by the processor for one of applying dynamic fixture offset compensation to the machine and post-processing an original machining program for updating the initial coordinate system as per the transformation matrix.

14. The system of claim 11, wherein the at least one application is executable by the processor for retrieving the theoretical measurements of the gas turbine engine part selected from the group consisting of a gas turbine engine blade, a fan blade, a case, a vane, and a vane segment.

15. The system of claim 14, wherein the system is for positioning error compensation during manufacturing of the part with a numerical control machining center and further wherein the at least one application is executable by the processor for causing one of a coordinate measuring machine connected to the machining center and a part probing system integrated with the machining center to acquire the actual measurements.

16. The system of claim 15, wherein the at least one application is executable by the processor for
    retrieving the theoretical measurements comprising retrieving coordinates of each one of the plurality of control points,
    instructing the probing system to move towards the coordinates of each one of the control points and contact a surface of the part at a probe contact point, and
    recording a deviation between the coordinates of the control point and a location of the probe contact point.

17. The system of claim 16, wherein the at least one application is executable by the processor for formulating an equation of the deviation as a function of three translational offsets and three Euler angles and solving the equation for the translational offsets and Euler angles to obtain coefficients of the transformation matrix.

18. The system of claim 17, wherein the at least one application is executable by the processor for:
representing at least one of a position and an orientation of the part using the translational offsets and the Euler angles; and
for each one of the plurality of control points,
computing at least one surface normal vector at the control point,
computing from the at least one surface normal vector a tangential plane through the control point,
obtaining the location of the probe contact point, and,
comparing the coordinates of the control point to the location of the probe contact point to formulate the deviation as a function of the translational offsets and Euler angles.

19. The system of claim 18, wherein the at least one application is executable by the processor for computing an intersection between the tangential plane and a probing direction of the probing system to compute the location of the probe contact point.

20. A system for positioning error compensation during manufacturing of a complex-shaped gas turbine engine part with a machine, the system comprising:
means for retrieving theoretical measurements of a plurality of control points defined on the part;
acquiring, in an initial coordinate system of the machine, actual measurements of the plurality of control points defined on the part;
means for computing an error between the actual measurements of the part and the theoretical measurements of the part, the error indicative of a mis-positioning of the part in the initial coordinate system;
when the error is beyond a predetermined tolerance, means for computing a transformation matrix representative of at least one transformation to be applied to the initial coordinate system for adjusting at least one of a position and an orientation of the initial coordinate system to compensate the error, and applying the transformation matrix to the initial coordinate system to obtain a transformed coordinate system; and
generating a machining program for manufacturing the part based on the transformed coordinate system.

\* \* \* \* \*